Oct. 21, 1958　　　W. D. MULLINS　　　2,856,978
FIXTURE FOR SUPPORTING TIRE CASINGS
Filed Dec. 14, 1954
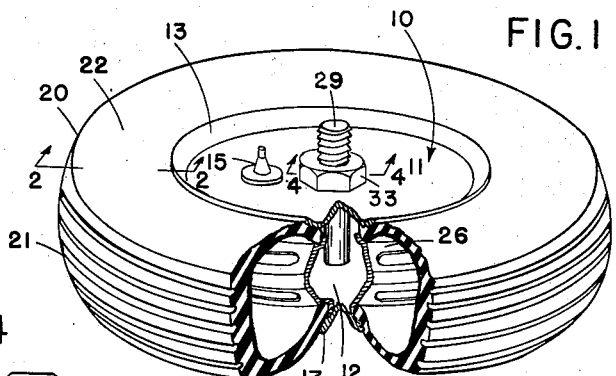
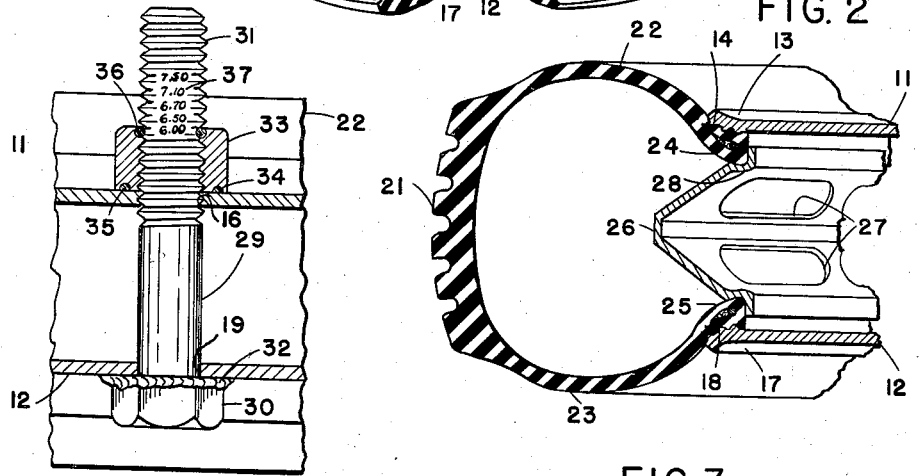
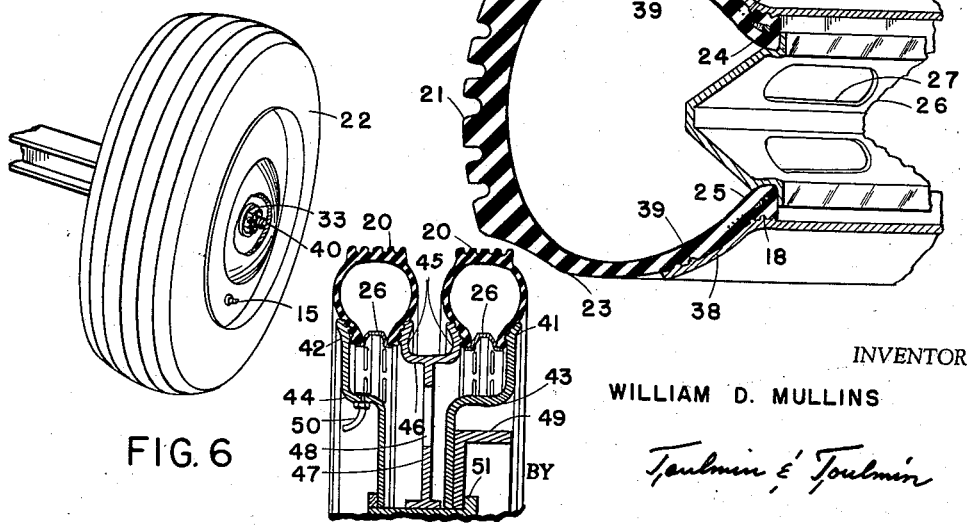
INVENTOR
WILLIAM D. MULLINS
ATTORNEYS

United States Patent Office 2,856,978
Patented Oct. 21, 1958

2,856,978
FIXTURE FOR SUPPORTING TIRE CASINGS

William D. Mullins, Dayton, Ohio

Application December 14, 1954, Serial No. 475,073

5 Claims. (Cl. 152—10)

The present invention relates to a fixture for supporting tire casings, more particularly to a fixture upon which the tire casing is mounted so as to form a closed chamber into which a gaseous medium may be introduced to inflate the tire casing.

There are several operations which are performed upon tire casings which require that the casing be supported and concurrently maintained under pressure. Buffing or recapping operations represent two of the most common operations performed on tire casings. In order that these operations may be successfully performed on tire casings, various methods and structures have been devised in order to maintain the tire under pressure conditions encountered when the tire is in normal usage.

In conventional practice, rubber bags or tubes have been positioned within the tire casing and then inflated to the desired pressure. However, these bags are rather expensive and are susceptible to breakage. Consequently, any damage to these rubber bags represents considerable loss.

Another disadvantage of these conventional rubber bags is that they deteriorate rapidly if exposed to steam. As it would be desirable during recapping operations to heat the inside of the tire casing, it can be seen that either an alternative structure must be devised or the expensive rubber bags used.

The present invention is directed to a supporting apparatus which eliminates the use of the conventional rubber bag, but at the same time permits the tire casing to be inflated to any desired pressure. The present invention essentially comprises two plates having annular beads thereon for engaging the side walls of the tire casing in the region of the bead of the tire. These plates are positioned against each side of the tire casing and urged into close engagement therewith by a suitable form of clamping means. A spring-like resilient member is positioned between the beads of the tire to urge the outer bead surface outwardly into engagement with the plates. A suitable valve inlet is provided in one of the plates in order that the gaseous medium such as air or steam may be introduced to the chamber formed by the tire casing and the plate.

In addition, the tire supporting fixture of this invention readily lends itself to be adapted to form a tire and wheel assembly which may be used as a road wheel on vehicles. This feature of the invention will be subsequently discussed in the description of the invention.

It is, therefore, the principal object of this invention to provide a novel and improved fixture for supporting tire casings.

It is a further object of this invention to provide a fixture which when supporting a tire casing forms an airtight chamber therewith.

Another object of this invention is to provide a fixture which enables tire casings mounted thereon to be inflated without the use of an inner rubber bag.

It is an additional object of this invention to provide a fixture for supporting tire casings which is simple in construction and may be easily adjusted to accommodate tire casings of various sizes.

It is still another object of this invention to provide a novel tire and wheel assembly which eliminates the use of an inner tube.

It is a still further object of this invention to provide a tire and wheel assembly which has a considerably improved cushioning effect.

It is still an additional object of this invention to provide a method of supporting and inflating a tire casing to enable various operations to be performed thereon.

Other objects and advantages of this invention will become apparent upon reference to the following description when taken in conjunction with the accompanying drawing wherein:

Figure 1 is a perspective view of the fixture with the tire casing mounted thereon and a portion of the tire casing removed;

Figure 2 is a sectional view taken along the lines 2—2 of Figure 1, illustrating the details of the sealing structure between the plates and the tire casing;

Figure 3 is a sectional view similar to that of Figure 2 and showing a modification of the plates;

Figure 4 is a sectional view taken along the lines 4—4 of Figure 1 showing the arrangement employed for clamping the plates in position;

Figure 5 is a perspective view illustrating the manner in which the fixture disclosed in this invention may be employed to form a tire and wheel assembly;

Figure 6 is a sectional view similar to that of Figures 2 and 3, illustrating a modification of the tire and wheel assembly depicted in Figure 5, and comprising a dual tire arrangement on a vehicle wheel.

Returning now to the drawing, more particularly to Figure 1 wherein like reference symbols indicate the same parts throughout the various views, 10 indicates generally a tire fixture constructed in accordance with this invention. The tire fixture 10 comprises an upper plate 11 and a lower plate 12. About the periphery of the upper plate 11 there is a beveled flange 13 which is preferably integral with the upper plate. There are annular beads of welding 14 on the outer surface of the flange 13. It is preferable that two or three of these beads be employed upon the flange. This structure is illustrated in greater detail in Figure 2.

An inlet valve 15 is mounted in the face of the upper plate 11. This valve 15 may be of any suitable type. The upper plate 11 also has a centrally disposed aperture 16.

The lower plate 12 is of similar construction to the upper plate 11. It has a beveled flange 17 located about the periphery thereof. This beveled flange 17 is integral with the lower plate 12 and has annular beads of welding 18 on the outer face thereof. There is a centrally disposed opening 19 in the lower plate which is aligned with the aperture 16 in the upper plate.

The two plates 11 and 12 are adapted to be positioned upon the opposite sides of a conventional tire casing indicated at 20. The tire casing 20 has the usual components, such as a tread 21, side walls 22 and 23 and beads 24 and 25. The beveled flanges 13 and 17 are so positioned on their respective plates that they engage the outer surfaces of the beads 24 and 25 respectively.

A resilient spring member 26 is positioned between the tire beads 24 and 25 and subsequently urges the tire beads outwardly into close engagement with the beveled flanges 13 and 17. There are a number of openings 27 in the spring member 26. The spring member 26 employed with this invention is substantially V-shaped in cross-section and has flat areas 28 at the outer end of each leg in order to engage the inner surfaces of the tire beads.

A clamping arrangement is provided to maintain the plates 11 and 12 at a predetermined distance apart when the casing is inflated. This clamping arrangement comprises a bolt 29 having a head 30 and external threads 31. The bolt 29 is inserted through the opening 19 in the lower plate 12 and is of sufficient length that the threaded portion 31 passes through the opening 16 and extends beyond the upper plate 11. The head 30 of the bolt is welded to the outer surface of the lower plate 12, as indicated at 32. The welding 32 serves both to secure the bolt in position and to prevent leakage of air or the like through the opening 19.

A nut 33 is threaded upon the threaded portion 31 of the bolt. The nut 33 has a recess 34 in the lower face thereof to receive a resilient O-ring 35 to serve as a seal between the nut 33 and the outer surface of the upper plate 11. A resilient sealing member 36 is similarly received within the threaded portion of the nut 33 in order to form a seal between the threads of the nut and the threads of the bolt. Suitable markings, as indicated at 37, are provided upon the threaded portion 31 of the bolt in order to indicate the position of the nut 33 so as to space the upper and lower plates at the proper distance to receive a tire casing of a particular size.

In employing the tire fixture disclosed as this invention, the spring member 26 is first inserted between beads of the tire. Next, the upper and lower plates 11 and 12, respectively, are positioned on opposite sides of the tire casing in such a manner that the beveled flanges thereon engage the outer surfaces of the tire beads. The nut 33 is then threaded upon the bolt 29 to a distance as indicated by the marking on the threads corresponding to the size of the tire casing. With the arrangement so far described, it can be seen that the tire beads are in close engagement with the upper and lower plates 11 and 12 because of the spreading action of the spring member 26 positioned between the tire beads. Air under pressure may then be introduced through the vave 15. The increase of pressure in the chamber formed by the tire casing and the upper and lower plates will subsequently force the casing against the beaded peripheries of the plates. The annular welded beads will be subsequently forced into the resilient surface of the tire casing and will consequently form seals which will retain the air between the plates and within the tire casing.

If desired, the tire fixture may be mounted upon any suitable supporting frame in order to perform an operation upon the tire casing. This supporting is not shown in the drawings.

The previous description has described that the tire casing is inflated with air under pressure. However, for certain processes, such as recapping, steam may be readily supplied to the inside of the tire casing by introducing it through the inlet valve 15. It is understood that a suitable valve would then be employed. Consequently, the tire casing may be quickly heated up to a desired temperature in order to assist in the curing of the tread portion which has been capped upon the tire casing.

Proceeding to Figure 3, there is illustrated therein a modification of the plates employed in this invention. This modification consists of extending the beveled flanges up the side wall of the casing for a distance of approximately three inches from the bead of the tire.

This extension is indicated at 38. At the end of extension 38 annular beads of welding 39 are provided in order to sealingly engage the side wall of the tire. This extension of the flange together with the welded beads thereon serves to offset any leakage which might occur immediately above the bead of the tire.

The arrangement of the tire fixture 10, as described above, and the tire casing 20, may be readily adapted for use as a road wheel on a vehicle. This use is illustrated in Figure 5. When used as a road wheel, the clamping arrangement for the two plates may be made hollow in order to fit upon the end of the vehicle axle, indicated at 40. The remainder of the construction is similar to that described previously. The result is a tubeless tire and wheel assembly which will result in a smoother riding vehicle because of the increased cushion effect due to the presence of the chamber between the plates which also retains air. In the conventional tubeless tire, air is retained only within the tire casing without the use of a separate tube although the casing has a sealing coating therein and includes means at the bead to seal against leakage. This arrangement, however, provides for a chamber which consists of the tire casing and the plates on each of the casings. This increased volume of air to support the vehicle will result in a considerably greater cushioning effect.

In Figure 6 there is illustrated a modified tire and wheel arrangement wherein the dual tire is mounted upon a vehicle wheel. In Figure 6 a pair of adjacent tire casings indicated at 20 have their outer beads in contact with peripheral flanges 41 and 42 of an inner wheel plate 43 and an outer wheel plate 44 respectively. The outer surfaces of the inner beads of the tire casing engage the peripheral flanges 45 which extend outwardly from a cylindrical portion 46 which in turn is mounted upon a circular plate 47 having apertures 48 therein. The peripheral flanges 41, 42 and 45 are similar to the flanges described in connection with Figure 2 in that the flanges have annular beads welded thereon in order to sealingly engage the outer surfaces of the tire casing beads. In addition, spring members 26 are also inserted between the beads of each of the tire casings 20 in order to urge the beads into engagement with the aforementioned peripheral flanges. The inner wheel plate 43 has a brake drum 49 secured thereto and the outer wheel plate 44 has an inlet valve 50 therein. The inner and outer wheel plates, together with the circular plate 47 are then mounted upon a suitable hub indicated at 51. The resulting wheel structure has dual tires both of which communicate with a single chamber formed by the inner and outer plates. This modification of the unitary dual tire and wheel arrangement may be readily employed in trucks and other types of commercial vehicles.

Thus, it can be seen that the present invention provides an arrangement whereby a tire casing may be readily mounted on a fixture and inflated without employing the conventional rubber bags in the casing. In addition, the casing may be inflated with any gaseous medium desired, depending upon the operation to be performed upon the tire casing. This gaseous medium may be air, steam or the like. This arrangement not only eliminates the rubber bag, but also greatly speeds up the preparation of tires for performing work thereon and speeds up the curing time of tires when they are being recapped since there is no necessity for heating the bag. As steam may be introduced within the tire casing itself, the heat is transmitted directly from the steam to the tire casing. Furthermore, the use of the welded annular bead provides an inexpensive yet effective structure for sealingly positioning plates upon both sides of a tire casing.

It will be understood that this invention is susceptible to modification in order to adapt it to different usages and conditions, and, accordingly, it is desired to comprehend such modifications within this invention as may fall within the scope of the appended claims.

What is claimed is:

1. In a fixture for supporting tire casings, the combination of, a tire casing, spaced coaxial disks with the peripheries thereof defining beveled flanges sealingly engaging the exterior surfaces of the tire beads of said tire casing so that said disks form a closed chamber with said tire casing, said chamber extending into said tire casing and said spaced disks, a resilient spring-like annulus having a substantially V-shaped cross-section retained between the beads of said tire casing to urge the exterior surfaces of said tire beads into sealing engagement with the flanges of said disks, said resilient annulus having openings therein to permit the passage of a gaseous medium therethrough, said annulus dividing the chamber but permitting the free flow of gaseous medium within the tire casing and between the spaced disks, means in one of said disks for introducing a gaseous medium under pressure into said chamber so as to establish a pressure within said chamber on both sides of said resilient annulus and to inflate said tire casing, and means for retaining said disks spaced at a predetermined distance.

2. In a fixture for supporting tire casings, the combination of, a tire casing, spaced coaxial disks with the peripheries thereof defining beveled flanges sealingly engaging the exterior surfaces of the tire beads of said tire casing so that said disks form a closed chamber with said tire casing, a plurality of annular beads on the inner surface of said beveled flanges to establish a seal with the exterior surfaces of said tire beads, said chamber extending into said tire casing and said spaced disks, a resilient spring-like annulus having a substantially V-shaped cross-section retained between the beads of said tire casing to urge the exterior surfaces of said tire beads into sealing engagement with the flanges of said disks, said resilient annulus having openings therein to permit the passage of a gaseous medium therethrough, said annulus dividing the chamber but permitting the free flow of gaseous medium within the tire casing and between the spaced disks, means in one of said disks for introducing a gaseous medium under pressure into said chamber so as to establish a pressure within said chamber on both sides of said resilient annulus and to inflate said tire casing, and means for retaining said disks spaced at a predetermined distance.

3. In a fixture for supporting tire casings, the combination of, a tire casing, spaced coaxial disks with the peripheries thereof defining beveled flanges sealingly engaging the exterior surfaces of the tire beads of said tire casing so that said disks form a closed chamber with said tire casing, said chamber extending into said tire casing and said spaced disks, a resilient spring-like annulus having a substantially V-shaped cross-section retained between the beads of said tire casing to urge the exterior surfaces of said tire beads into sealing engagement with the flanges of said disks, said resilient annulus having openings therein to permit the passage of a gaseous medium therethrough, said annulus dividing the chamber but permitting the free flow of gaseous medium within the tire casing and between the spaced disks, means in one of said disks for introducing a gaseous medium under pressure into said chamber so as to establish a pressure within said chamber on both sides of said resilient annulus and to inflate said tire casing, and means for retaining said disks spaced at a predetermined distance, the said retaining means being adjustable so that said spaced disks can accommodate tire casings of varying widths.

4. In a fixture for supporting tire casings, the combination of, a tire casing, spaced coaxial disks with the peripheries thereof defining beveled flanges sealingly engaging the exterior surfaces of the tire beads of said tire casing so that said disks form a closed chamber with said tire casing, said chamber extending into said tire casing and said spaced disks, a resilient spring-like annulus having a substantially V-shaped cross-section retained between the beads of said tire casing to urge the exterior surfaces of said tire beads into sealing engagement with the flanges of said disks, said resilient annulus having openings therein to permit the passage of a gaseous medium therethrough, said annulus dividing the chamber but permitting the free flow of gaseous medium within the tire casing and between the spaced disks, means in one of said disks for introducing a gaseous medium under pressure into said chamber so as to establish a pressure within said chamber on both sides of said resilient annulus and to inflate said tire casing, there being an aperture in one of said spaced disks, a bolt attached to the other of said disks and having one end thereof extending through said aperture, threads on said bolt end, a nut threaded on said bolt outwardly of the disk, sealing means between said nut and disk and said nut and threads, and means on said bolt threads to indicate the positions of the disks for various tire widths.

5. A tire and wheel assembly for a vehicle comprising, a tire casing, spaced coaxial disks with the peripheries thereof defining beveled flanges sealingly engaging the exterior surfaces of the tire beads of said tire casing so that said disks form a closed chamber with said tire casing, said chamber extending into said tire casing and said spaced disks, a resilient spring-like annulus having a substantially V-shaped cross-section retained between the beads of said tire casing to urge the exterior surfaces of said tire beads into sealing engagement with the flanges of said disks, said resilient annulus having openings therein to permit the passage of a gaseous medium therethrough, said annulus dividing the chamber but permitting the free flow of gaseous medium within the tire casing and between the spaced disks, means in one of said disks for introducing a gaseous medium under pressure into said chamber so as to establish a pressure within said chamber on both sides of said resilient annulus and to inflate said tire casing, and hub means supporting said spaced disks and spacing said disks at a predetermined distance apart.

References Cited in the file of this patent

UNITED STATES PATENTS

| | | |
|---|---|---|
| 1,023,454 | Black | Apr. 16, 1912 |
| 2,074,284 | Stevenson | Mar. 16, 1937 |
| 2,289,965 | Herman | July 14, 1942 |
| 2,517,521 | Zere | Aug. 1, 1950 |
| 2,577,516 | Firth | Dec. 4, 1951 |
| 2,597,550 | Tritt | May 20, 1952 |
| 2,697,252 | Clark | Dec. 21, 1954 |

FOREIGN PATENTS

| | | |
|---|---|---|
| 3,968 | Great Britain | of 1891 |